(12) United States Patent
Van Wiemeersch (10) Patent No.: US 10,586,226 B2
(45) Date of Patent: Mar. 10, 2020

(54) INTEGRATION OF VEHICLE BOUNDARY ALERT SYSTEM WITH EXTERNAL TRANSACTION EQUIPMENT

(71) Applicant: Ford Global Technologies, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/083,540

(22) PCT Filed: Mar. 10, 2016

(86) PCT No.: PCT/US2016/021665
§ 371 (c)(1),
(2) Date: Sep. 10, 2018

(87) PCT Pub. No.: WO2017/155532
PCT Pub. Date: Sep. 14, 2017

(65) Prior Publication Data
US 2019/0080313 A1 Mar. 14, 2019

(51) Int. Cl.
| | |
|---|---|
| G06Q 20/00 | (2012.01) |
| G06Q 20/32 | (2012.01) |
| G01S 13/931 | (2020.01) |
| H04W 4/02 | (2018.01) |
| H04N 7/18 | (2006.01) |
| B62D 15/02 | (2006.01) |
| G01S 13/88 | (2006.01) |
| H04W 4/40 | (2018.01) |

(Continued)

(52) U.S. Cl.
CPC ........ G06Q 20/3224 (2013.01); B60R 25/10 (2013.01); B60R 25/305 (2013.01); B62D 15/027 (2013.01); G01S 13/886 (2013.01); G01S 13/931 (2013.01); H04N 7/18 (2013.01); H04N 7/181 (2013.01); H04W 4/023 (2013.01); H04W 4/40 (2018.02); H04W 4/027 (2013.01); H04W 4/44 (2018.02)

(58) Field of Classification Search
USPC ........................................................ 235/384
See application file for complete search history.

(56) References Cited

U.S. PATENT DOCUMENTS

| | | |
|---|---|---|
| 5,780,825 A | 7/1998 | Sato et al. |
| 6,547,133 B1 | 4/2003 | DeVries et al. |

(Continued)

OTHER PUBLICATIONS

Angel, Jonathan, "Microsoft's New Automotive OS Hits the Road," Oct. 19, 2010, Windows for Devices eWeek.*

(Continued)

*Primary Examiner* — Daniel A Hess
(74) *Attorney, Agent, or Firm* — Gregory P. Brown; Brooks Kushman P.C.

(57) ABSTRACT

A vehicle includes a boundary alert system. The boundary alert system includes at least one camera and a controller. The controller is programmed to activate the boundary alert system when the vehicle is in proximity to an external transaction system. The controller further outputs boundary alert system data for display on a screen. The screen also displays transaction data for the external transaction system.

19 Claims, 4 Drawing Sheets

(51) Int. Cl.
    *B60R 25/10*     (2013.01)
    *B60R 25/30*     (2013.01)
    *H04W 4/44*     (2018.01)

(56) References Cited

U.S. PATENT DOCUMENTS

| | | |
|---|---|---|
| 6,690,268 B2 | 2/2004 | Schofield et al. |
| 7,497,371 B1 | 3/2009 | Sparks |
| 9,229,905 B1 | 1/2016 | Penilla et al. |
| 2001/0045775 A1 | 11/2001 | Mittermeier et al. |
| 2005/0021224 A1 | 1/2005 | Gray |
| 2006/0132294 A1 | 6/2006 | Spark |
| 2011/0285519 A1 | 11/2011 | Scheuermann |
| 2012/0306664 A1 | 12/2012 | Geter |
| 2013/0261845 A1* | 10/2013 | Ho .................. G06F 17/00 701/2 |
| 2014/0279491 A1 | 9/2014 | Martin et al. |
| 2015/0094910 A1 | 4/2015 | Bassier et al. |
| 2016/0057270 A1* | 2/2016 | Kazanchian ...... H04M 1/72525 455/419 |
| 2017/0353776 A1* | 12/2017 | Holden ............ H04N 21/814 |

OTHER PUBLICATIONS

International Search Report for PCT/US2016/021665 dated May 27, 2016, 2 pages.

\* cited by examiner

INTEGRATION OF VEHICLE BOUNDARY ALERT SYSTEM WITH EXTERNAL TRANSACTION EQUIPMENT

CROSS-REFERENCE TO RELATED APPLICATION

This application is the U.S. national phase of PCT Application No. PCT/US2016/021665 filed on Mar. 10, 2016, the disclosure of which is incorporated in its entirety by reference herein.

TECHNICAL FIELD

This application relates generally to vehicle boundary alert systems.

BACKGROUND

In order to satisfy customers, many businesses have established drive-through service lanes. The drive-through service lanes allow customers to conduct a transaction without leaving their vehicles. Examples of drive-through service lanes include fast-food restaurants and banks. In some configurations, service is transacted via a two-way communication and/or via a window with an employee that may be remote or nearby. In other configurations, such as at a bank, the transaction may be fully automated with a machine. In these cases, the customer is typically required to drive up to the transaction device to conduct the transaction.

SUMMARY

A vehicle boundary alert system includes one or more boundary alert sensors including at least one camera. The vehicle also includes a display. The vehicle also includes a controller programmed to, in response to establishing communication with an external transaction system to perform a transaction, cause the display to show screen data received from the external transaction system in a first display zone and a video stream from the at least one camera in a second display zone to facilitate the transaction.

A vehicle includes one or more boundary alert sensors including a plurality of cameras for monitoring a plurality of detection zones. The vehicle also includes a controller programmed to output screen data received from an external transaction system to a display device and, in response to signals from the boundary alert sensors being indicative of a potential threat in one of the detection zones while communicating with the external transaction system to perform a transaction, cause the display device to show a video stream from one of the cameras associated with the one of the detection zones.

A method includes activating, by a controller, a boundary alert system of a vehicle in response to the vehicle being proximate an external transaction system. The method also includes outputting, by the controller, a video stream from an on-board camera and data indicative of a presence and a position of a potential threat identified by the boundary alert system to a display unit for display on a screen with a transaction interface from the external transaction system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
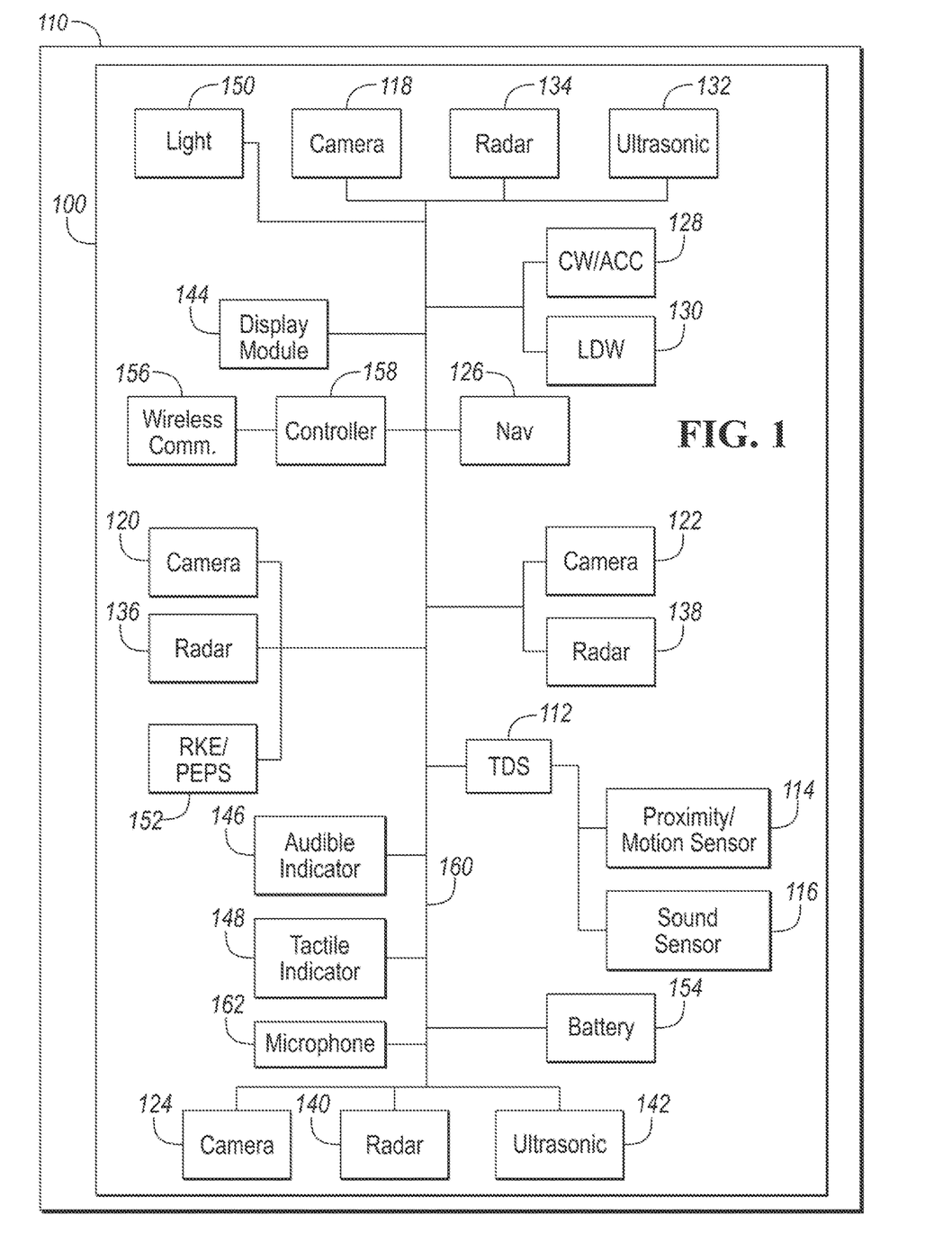
FIG. 1 depicts a possible diagram of a vehicle configured to interface with drive-through transaction equipment.

A vehicle 110 may be configured to provide various security related features. FIG. 1 depicts a possible vehicle configuration that includes a boundary alert system 100 that may be utilized for security related features. The vehicle 110 may include a theft-deterrent system (TDS) 112. The theft-deterrent system 112 may interface with various components to detect potential threats and generate alerts to deter theft of the vehicle 110 and its contents. The theft-deterrent system 112 may interface with a proximity or motion sensor 114 to detect movement of the vehicle 110. The motion sensor 114 may be a vibration sensor that detects vibrations of the vehicle 110 that may be caused by movement of or contact with the vehicle 110. The theft-deterrent system 112 may interface with sound or pressure sensors 116 to detect noise or pressure changes that may be associated with broken glass or other forced entry. The motion sensor 114 may include infrared sensors to detect the presence of persons within the passenger cabin. The theft-deterrent system 112 may interface with door sensors that indicate when a door is opened or closed.

The vehicle 110 may include various devices that may not traditionally be part of the theft-deterrent system 112 but that may be useful for enhancing the vehicle security function. The vehicle 110 may include various systems and sensors that, when combined, may be described as the boundary alert system 100. The boundary alert system 100 may include any vehicle sub-system that senses objects within a range or boundary surrounding the vehicle 110. The sensors associated with the boundary alert system 100 may be referred to as boundary alert sensors. For example, the boundary alert system 100 may include one or more cameras 118, 120, 122, 124 that are part of various vehicle sub-systems. The cameras 118, 120, 122, 124, may be configured to output a video signal when activated. The video signal may be displayed and further processed (e.g., for object detection). For example, the vehicle 110 may include a rear-facing camera 124 that provides video of an area behind the vehicle 110 and may be integrated into a reverse parking aid (RPA), backup monitoring system, and/or surround-view system. The vehicle 110 may also include a forward-looking camera 118 that may be used as part of an Adaptive Cruise Control (ACC) and/or Collision Warning (CW) system 128 or a Lane-Departure Warning (LDW) system 130. Additional side-facing cameras 120, 122 may be part of a Blind Spot Warning System (BLIS).

The boundary alert system 100 may include a controller 158 that is configured to coordinate and manage the signals from the boundary alert sensors. The controller 158 may include a processor for executing instructions. The controller 158 may include volatile and non-volatile memory. The controller 158 may be programmed to implement detection algorithms associated with the boundary alert sensors. The controller 158 may be comprised of multiple processing devices. Further, functions described as associated with the controller 158 may be implemented in multiple processors within the vehicle 110.

The boundary alert system 100 may include one or more radar systems 134, 136, 138, 140 that are configured to detect objects in various positions around the vehicle 110. The radar systems 134, 136, 138, 140 may detect objects around the vehicle 110 and a relative motion of the objects. The radar systems 134, 136, 138, 140 may operate by transmitting an electromagnetic wave and receiving a reflected electromagnetic wave from objects in the path of the transmitted electromagnetic wave. The output of the radar systems 134, 136, 138, 140 may include signals that indicate a presence of the object, a position of the object relative to the vehicle 110, and a relative velocity of the object. A forward-looking radar 134 may provide information associated with objects located in an area to the front of the vehicle 110. The ACC/CW systems may utilize outputs of the forward looking radar 134. Side-facing radars 136, 138 may provide information associated with objects located in an area to the sides of the vehicle 110. The BLIS may utilize outputs of the side-facing radars 136, 138. The backup-monitoring system 126 may include a rear-facing radar 140. The radar systems 134, 136, 138, 140 may detect motion of objects at a greater range than the proximity sensors 114 of the theft deterrent system 112. The radar systems 134, 136, 138, 140 may be configured to detect objects in front of the vehicle, behind the vehicle, and along either side of the vehicle. The radar systems 134, 136, 138, 140 may be laser-based radar systems (e.g., LIDAR). In some configurations, multiple types of radars may be utilized. For example, the vehicle 110 may include a combination of long-range radars, LIDAR and short/medium range radars facing a given direction to provide a variety of radar coverage options.

Electronic modules, including the controller 158 and the various boundary alert sensors, in the vehicle 110 may communicate via a vehicle network 160. The vehicle network 160 may include a plurality of channels for communication. One channel of the vehicle network 160 may be a serial bus such as a Controller Area Network (CAN). One of the channels of the vehicle network 160 may include an Ethernet network defined by Institute of Electrical and Electronics Engineers (IEEE) 802 family of standards. Additional channels of the vehicle network 160 may include discrete connections between modules and may include power signals from the vehicle battery 154. Different signals may be transferred over different channels of the vehicle network 160. For example, video signals may be transferred over a high-speed channel (e.g., Ethernet) while control signals may be transferred over CAN or discrete signals. The vehicle network 160 may include any hardware and software components that aid in transferring signals and data between modules.

The boundary alert system 100 may include one or more ultrasonic sensors 132, 142. A rear-facing ultrasonic sensor 142 may be part of the backup monitoring system and a front-facing ultrasonic sensor 132 may be part of a front parking aid system. The ultrasonic sensing systems 132, 142 may detect objects within a predetermined range of the vehicle 110. The ultrasonic sensing systems 132, 142 may emit high-frequency sound waves and detect a signal reflected from an object. In some configurations, additional ultrasonic sensors may be mounted on the sides of the vehicle to provide coverage on all sides of the vehicle 110.

The boundary alert system 100 may include various warning and indicator devices. The warning and indicator devices may include visual indicators such as lamps and a display module 144. The display module 144 may include a liquid crystal display (LCD) module. The display module 144 may be a touch-screen display that is configured to provide data indicative of a touched position on the display 144. For example, the display module 144 may be commanded to display a virtual button at a predetermined position of the display module 144. Upon detecting contact with the screen, the display module 144 may output a signal indicative of a screen position that was contacted. The display module 144 may be interfaced to the controller 158 via the vehicle network 160. The controller 158 may be configured to compare the predetermined position to the contact position to ascertain if the virtual button was pressed.

The warning and indicator devices may include one or more audible indicators 146. The audible indicators 146 may include speakers, buzzers, alarms, and horns. The warning and indicator devices may include tactile indicators 148 that cause a vibration (e.g., steering wheel vibration). Various control elements such as relays or switching devices may be associated with the warning and indicator devices to allow the controller 158 to modify the state of the warning and indicator devices. The warning and indicator devices may be configured to be sensed by persons external to the vehicle 110. For example, the vehicle 110 may include headlights 150 that may be utilized as an indicator. Additional lights that may be used include tail lights, brake lights, and dome lights. Some warning and indicator devices may be configured to be sensed by persons that are in the vehicle 110.

The display module 144 may be configured to display pictures and video from the cameras 118, 120, 122, 124. The display screen 144 may be located in a dashboard of the vehicle 110. In some configurations, the display screen 144 may be configured to display video from an active camera under certain conditions. For example, when a transmission of the vehicle 110 is in a reverse gear, video images from the backup camera 124 may be displayed. In some configurations, the video from the cameras 118, 120, 122, 124 may be displayed when the vehicle 110 is in a parked condition (e.g., transmission gear is PARK). In some configurations, the video signal may be displayed during a parking maneuver. In some configurations, the video signal that is displayed may be selected by an operator. In some configurations, output of video to the display module 144 may be inhibited when the vehicle 110 is moving.

In some configurations, the theft-deterrent system 112 may be activated when the vehicle 110 is locked. Locking of the vehicle 110 may be performed in a variety of ways. For example, inserting a key into the locking mechanism and rotating in a predetermined direction may lock the vehicle 110 and activate the theft deterrent system 112. The theft-deterrent system 112 may be activated from a key fob remote from the vehicle. In some configurations, the sensors of the theft-deterrent system 112 may be activated and monitored when the vehicle 110 is unlocked and unarmed.

The boundary alert system 100 of the vehicle 110 may include one or more microphones 162. The microphone 162 may be located in the passenger cabin to receive sound from inside the vehicle 110. In some configurations, the microphone 162 may be configured to receive sound from outside of the vehicle 110. The microphone 162 may be incorporated into the boundary alert system 100 to record sound during an event. Usage of the microphone 162 to record sounds in and around the vehicle may be limited by state laws.

The vehicle 110 may include a wireless communications module 156 to communicate with devices remote from the vehicle 110. The wireless communications module 156 may be interfaced to the controller 158 to provide communication with devices that are not directly coupled to the vehicle network 160. The wireless communications module 156 may include an onboard modem having an antenna to communicate with off-board devices. The wireless communications module 156 may be a cellular communications device to enable communications via a cellular data network. The wireless communications module 156 may be configured to communicate according to the IEEE 802.11 standard. The wireless communications module 156 may be configured to utilize BLUETOOTH low energy (BTLE), dedicated short-range communication (DSRC) or any other standard wireless communication methods and protocols. The wireless communications module 156 may be configured to establish communication with a nomadic device (e.g., phone, tablet, computer). The controller 158 may be programmed to implement an appropriate communications protocol in hardware and software that is compatible with a selected mode of wireless communication.

The vehicle 110 may include a navigation system 126 that is configured to determine a position of the vehicle 110. The position may be determined using coordinates from a Global Positioning System (GPS) interface. The navigation system 126 may communicate with the controller 158 over the vehicle network 160 to provide vehicle position data.

The theft-deterrent system 112 may monitor the one or more proximity or motion sensors 114. The motion sensors 114 may detect motion of the vehicle 110 or motion of an object in the passenger cabin. The theft-deterrent system 112 may include a controller to monitor the motion sensors 114 to trigger the audible indicator 146 under certain conditions. For example, the detection of motion of the vehicle 110 may activate the horn continuously or with a predetermined on-off pattern. In some configurations, the detection of vehicle movement may trigger a controller to record video from one or more of the cameras 118, 120, 122, 124. In some configurations, the system may be configured to capture video before the actual alarm trigger to capture events leading up to the triggering of the alarm. In such a configuration, one or more of the cameras 118, 120, 122, 124 may be activated as part of the theft-deterrent system 112.

In addition to enhancing vehicle security, some configurations may utilize the boundary alert sensors for other purposes. The vehicle 110 may include a surveillance mode in which video from the cameras 118, 120, 122, 124 is displayed on the display screen 144. The surveillance mode may be enabled when the vehicle 110 is in a parked condition to avoid distraction while driving. The operator may select to enter the surveillance mode. The driver may elect to enter the surveillance mode when the vehicle is in a stationary condition at a drive-through window. The stationary condition may include a vehicle gear selector being in a drive or neutral gear with the brake pedal depressed and/or the vehicle gear selector being in a park gear. During a parked condition, the boundary alert sensors may be activated to detect moving objects near the vehicle 110. The movement may cause the video signal from one of the cameras 118, 120, 122, 124 to be displayed on the display screen 144.

In some configurations, the controller 158 may be configured to implement a boundary alert function. The boundary alert function may be configured to detect movement in a particular area near and/or around the vehicle 110. The controller 158 may receive and monitor inputs from the various boundary alert sensors described. The controller 158 may be programmed with algorithms to detect a presence of potential threats that are in a vicinity of the vehicle 110. For example, the front-facing radar 134 may be activated to detect movement in the area in front of the vehicle 110. When the controller 158 receives signals indicative of movement being detected, the audible indicator 146 or the visual indicator (e.g., lights 150) may be activated to alert persons nearby. In addition, the display screen 144 may be used to display boundary alert sensor data. For example, objects may be displayed relative to an image of a vehicle to indicate a relative position of objects or persons that are in the vicinity of the vehicle 110.

The boundary alert system 100 may provide sensing coverage around the periphery of the vehicle. A plurality of detection zones may be defined. The boundary alert sensors may be associated with one or more of the detection zones. The boundary alert sensors may provide sensor data associated with one or more of the detection zones. For example, a detection zone may be defined in each direction from the vehicle. A front detection zone, a rear detection zone, a right-side detection zone and a left-side detection zone may be defined. Further, one or more cameras may be associated with each of the detection zones.

Figure 2:
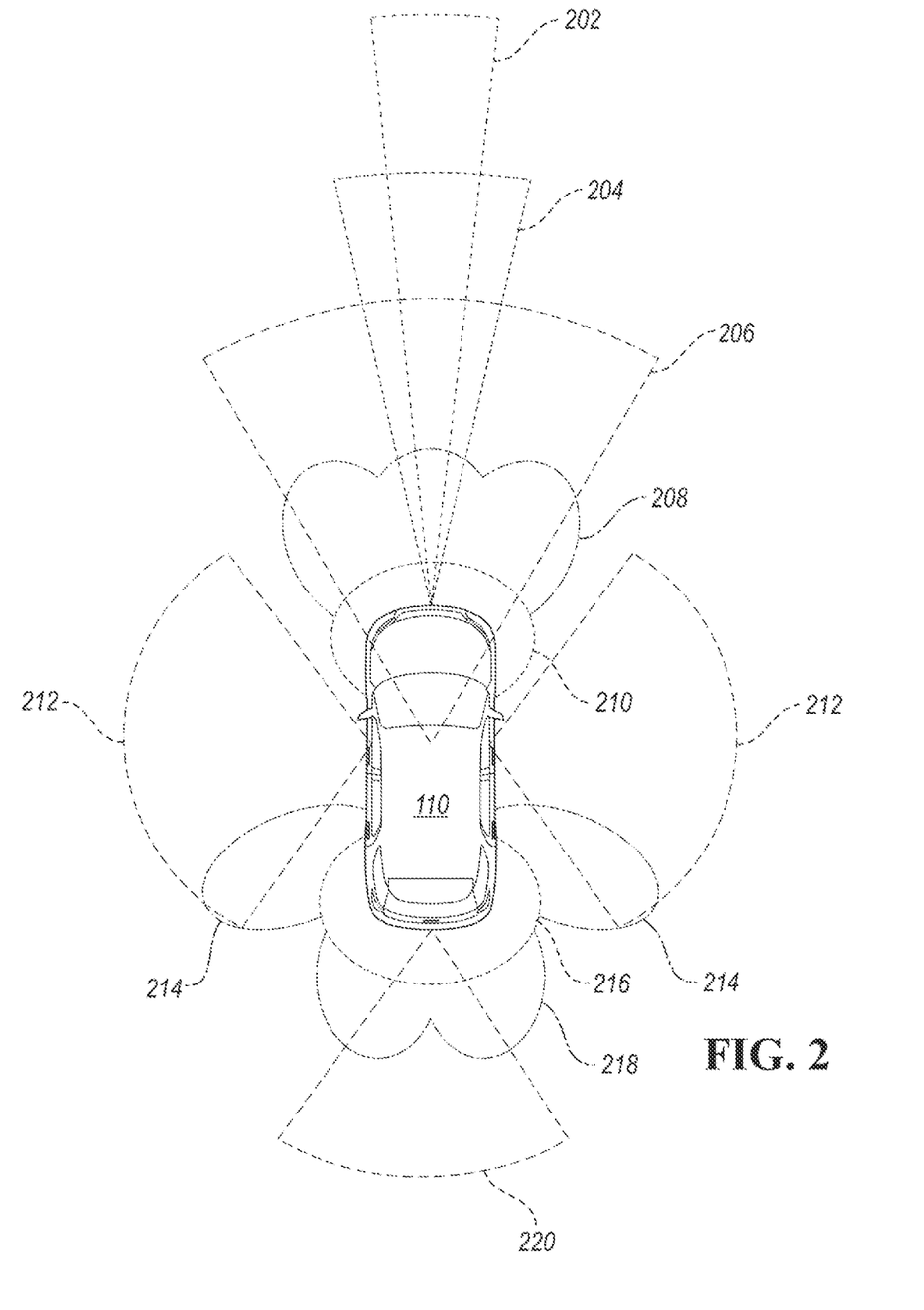
FIG. 2 depicts possible coverage areas of various boundary alert sensors in the vehicle.

FIG. 2 depicts possible zones of coverage by the boundary alert system 100. Note that coverage areas provided by each of the boundary alert sensors may overlap. The various coverage zones may be described by the vehicle function and the sensor technology that provides the coverage. For example, a long-range radar zone 202 may extend from the front of the vehicle 110. A primary purpose of the long-range radar zone 202 may be for adaptive cruise control applications. Coverage may be realized using a long-range radar system. A LIDAR zone 204 may also extend from the front of the vehicle 110. A primary purpose of the LIDAR zone 204 may be for emergency braking, pedestrian detection, and collision avoidance applications. A front camera zone 206 may extend from the front of the vehicle 110. Primary purposes of the front-camera zone 206 may be for traffic sign recognition and lane departure warning. A short/medium range radar zone 208 may extend from the front of the vehicle 110. A primary purpose of the short/medium range radar zone 208 may be for a cross traffic alert system. Finally, a front ultrasound zone 210 may extend from the front of the vehicle 110. A primary purpose of the front ultrasound zone 210 may be for a park assist system. Note that the shape of the coverage zones are illustrative and may vary in actual implementation based on the particular sensor technology implemented. Further, different combinations of the sensors may be implemented such that the number of coverage zones may vary based on the application.

Sensors may also provide coverage to sides of the vehicle 110. Side camera zones 212 may extend from each side of the vehicle 110. The primary purpose of the side-camera zones 212 may be for a surround view system. Side short/medium range radar zones 214 may extend from each side of the vehicle 110. The purpose of the side short/medium range radar zones 214 may be for a blind-spot detection system. The side camera zones 212 may include a right-side or passenger side zone and a left-side or driver side zone.

Additional sensors may provide coverage to the rear of the vehicle. A rear ultrasound zone 216 may extend from the rear of the vehicle 110 and may be utilized as part of the park assist system. A rear short/medium range radar zone 218 may extend from the rear of the vehicle 110 and may be utilized as part of a rear collision warning system. A rear-facing camera zone 220 may extend from the rear of the vehicle 110 and may be utilized as part of the park assist system and the surround-view system.

It is observed that the sensors that are included as part of the boundary alert system 100 can provide 360 degree coverage of the vehicle 110. The array of sensors present may be used to detect objects and persons that are in the vicinity of the vehicle 110. The controller 158 may monitor the boundary alert sensor signals to determine the presence of a potential threat near the vehicle 110. Further, the boundary alert system 100 may be able to identify the presence of a potential threat in one or more of the defined detection zones. The different boundary alert sensors have varying ranges and capabilities and when combined can provide a very powerful alert system. The boundary alert system 100 may be configured to detect a presence of objects. The boundary alert system 100 may be configured to detect movement of objects. A potential threat may be defined as an object that is moving through one or more of the detection zones. When image recognition algorithms are used, a potential threat may be a presence of a person identified in one or more of the detection zones.

The boundary alert system 100 may be used to enhance driver security in various situations related to external transaction systems. An external transaction system may be an automated machine, often drive-up/drive-through, that is configured to process a transaction. The external transaction system generally allows customers to initiate and complete a transaction without leaving the vehicle. The external transaction system may also include walk-up systems that may be in a vicinity of a parking area. A walk-up system transaction system may be in a vicinity of the vehicle 110 and within range of one or more of the detection zones.

Many examples exist for external transaction systems. For example, many bank transactions are made at drive-through automated teller machines (ATM). While the vehicle 110 is stopped at an ATM, the driver may be at increased risk of robbery or other criminal acts. Being focused on the transaction in progress, the driver may neglect to scan the nearby area for threats that may be lurking nearby. The boundary alert system 100 may be utilized to improve driver security during such activities. Similar situations may be present in other drive-through situations. For example, at a fast-food restaurant drive-through lane. Other examples include parking lot entrances/exits and self-serve car wash facilities. While handling the transaction at the external transaction system, the driver may have the vehicle windows down and may be focused on the transaction. In this distracted condition, the driver may be vulnerable to criminal activity.

For example, at a bank automated teller machine (ATM), a number of factors may result in reduced personal security. In some cases, the driver may need to open the door to reach the ATM controls making the driver vulnerable and raising the difficulty of driving away quickly. Some vehicles may be configured to unlock all doors in response to opening one door creating the risk of criminal entry through another door. The driver-side window is typically in an open position during the transaction. The driver's hands may be occupied operating the ATM making it difficult to access a phone or key in an emergency. The driver's attention may be focused on the ATM causing the driver to be less aware of surroundings, particularly to the rear and far side of the vehicle. Additionally, as the vehicle may be running, the panic feature of the vehicle key fob may not be configured to activate when requested. Add to this the fact that a customer at a bank ATM is a predictable target for criminal activity as a common transaction is a cash withdrawal from the ATM.

Figure 3:
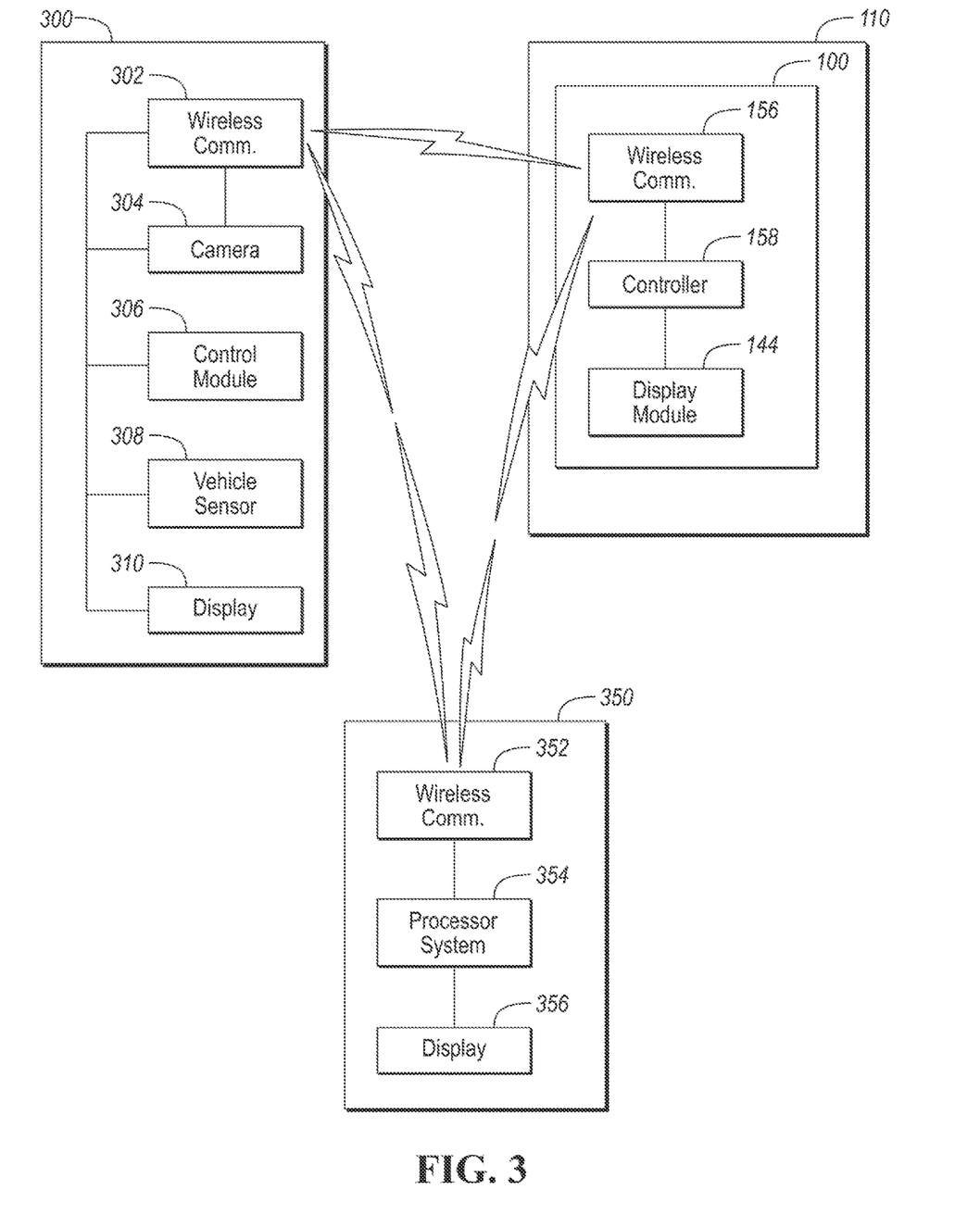
FIG. 3 depicts a possible diagram of a vehicle in proximity to an external transaction system.

One way to improve driver security is to provide a solution for conducting drive-through transactions within the vehicle. FIG. 3 depicts a block diagram of the vehicle 110 in proximity to an external transaction system 300 and a nomadic device 350. For example, the external transaction system 300 may be a bank ATM. The external transaction system 300 may include a control module 306 that includes a controller having processing and storage capability and appropriate input/output interfaces.

The controller 158 may be configured to implement a remote Graphical User Interface (GUI) via the display module 144 for the external transaction system 300. The controller 158 may be configured to establish communications with the external transaction system 300 (e.g., ATM) and transactions may be conducted using the display module 144 in the vehicle 110 to display messages and enter commands. Communications between the external transaction system 300 and the controller 158 may be via a wireless protocol. For example, when a secure connection is established between the controller 158 and the external transaction system 300, the display module 144 may act as the remote GUI for the external transaction system 300. Screen data that may normally appear on a display screen 310 of the external transaction system 300 may now appear on the display module 144 of the vehicle 110. This allows the vehicle operator to interact with the display module 144 in the vehicle 110 instead of the external transaction system 300.

The external transaction system 300 may include a wireless communication module 302 that is coupled to the control module 306. The wireless communications module 302 may be configured to communicate according to the IEEE 802.11 standard. The wireless communications module 302 may be configured to utilize BLUETOOTH low energy (BTLE), dedicated short-range communication (DSRC) or any other standard wireless communication methods. The wireless communication module 302 may be configured to communicate via similar protocols as the vehicle 110. The control module 306 may be configured to, in response to detecting that the vehicle 110 is in proximity to the external transaction system 300, establish communication with the vehicle 110 via the wireless communication module 302.

The control module 306 may be linked to an external network. The control module 306 may include an Ethernet interface. The control module 306 may be configured to communicate via the external network. For example, the vehicle 110 may establish communications to the external network via a cellular communications protocol. Communication between the vehicle 110 and the external transaction system 300 may be direct via the wireless communication module 302 or indirect via the external network.

The control module 306 may be coupled to components of the external transaction system 300 to control operation of the external transaction system 300. The external transaction system 300 may include one or more cameras 304. The cameras 304 may provide video streams of areas near the external transaction system 300. In addition, the cameras 304 may provide video of the vehicle 110 when it is in proximity to the external transaction system 300. Video from the cameras 304 may be stored in non-volatile memory of the control module 306 for later retrieval. The cameras 304 may be part of a building security system. In some configurations, live video feed may be provided to display screens in a nearby building or a remote location.

The external transaction system 300 may include a vehicle detector 308 that is configured to detect a presence of a vehicle in proximity to the external transaction system 300. The vehicle detector 308 may include a magnetic sensor, a weight sensor, and/or an ultrasonic sensor. Further, the presence of the vehicle 110 may be detected by processing video from the cameras 304. Upon detecting the presence of the vehicle 110, the control module 306 may establish communication with the vehicle 110 via the wireless communication module 302.

The external transaction system 300 may include a display 310 that is configured to provide an interface between the customer and the external transaction system 300. The display 310 may be a touch-screen device that allows entry of information based on contact with the screen. Further, the display 310 may include physical and/or virtual buttons and switches for entry of commands or requests. For example, physical buttons may be aligned adjacent a screen of the display 310 to allow selection of displayed items. The physical buttons may be electrically interfaced to the control module 306. The external transaction system display 310 may be interfaced to the control module 306. The control module 306 may be configured to control and operate the external transaction system display 310.

Once communication is established between the control module 306 and the controller 158, the control module 306 may transmit display information to the controller 158. The controller 158 may receive the display information via the vehicle wireless communication module 156. The controller 158 may receive the screen data and output the screen data to display module 144. The display of information may be similar to that which is displayed on the external transaction system display 310. The driver may interface with the vehicle display module 156 to complete the transaction. The controller 158 may communicate driver requests and commands through the wireless communication module 156 to the control module 306 of the external transaction system 300.

To improve driver safety, the boundary alert system 100 may be activated in response to the vehicle 110 establishing communication with the external transaction system 300. Further, the boundary alert system 100 may be activated upon recognition that the vehicle is proximate the external transaction system 300, such as having entered a banking institution location or approaching an ATM. The vehicle 110 may be proximate the external transaction system 300 when wireless communications can be established between the two (e.g., dependent upon wireless communication range). The vehicle 110 may be proximate the external transaction system 300 when the vehicle 110 is less than a predetermined distance from the external transaction system 300. In some configurations, an audible alert may be generated when a potential threat is identified by the boundary alert system 100. In some configurations, a portion of the display module 144 may be dedicated to boundary alert system information. For example, video streams from cameras 118, 120, 122, 124 may be output to the display module 144. Driver safety is enhanced as the video streams are displayed on the same screen as the external transaction system screen data making it more likely that the driver will notice suspicious activity near the vehicle 110.

Driver safety may be further enhanced by processing data from the boundary alert sensors (as described with reference to FIG. 1). For example, the front-facing radar 134 may output a signal indicating an object moving toward the vehicle 110. The controller 158 may, in response to receiving signals indicative of a presence of an object in a particular direction, highlight the video stream of a camera in the particular direction. This provides a signal to the driver to check the video feed and may aid in directing the driver's attention to the video feed (or look out the window) for potential threats. Further, the highlighted video provides an indication as the direction of the potential threat and allows the driver to respond rapidly and in the correct direction. The controller 158 may also cause the display 144 to show an alert indicator when an object is detected within a predetermined distance of the vehicle 110.

In addition, the external transaction system 300 may be configured to transmit video from the external transaction system camera 304 to the vehicle 110 for display. The control module 306 may transmit a video stream from the external transaction system camera 304 to the controller 158. The vehicle controller 158 may receive the video stream from the external transaction system camera 304 and output the external transaction system video stream to the display module 144. The external transaction system cameras 304 may provide coverage in areas that are not covered by the vehicle cameras further enhancing driver safety. For example, the external transaction system cameras 304 may include coverage around corners of the building that are not readily visible from the vehicle location. The controller 158 may be programmed to process the video stream from the external transaction system cameras 304 to identify motion or potential threats. For example, the controller 158 may include a digital signal processor (DSP) that is programmed to include facial recognition algorithms. The controller 158 may process the video signal and, in response to the facial recognition algorithm detecting a presence of a person in the video, alert the driver in the manners herein described. Further, such facial recognition logic may be incorporated on any video streams including those received from the on-board cameras. In other configurations, the video streams from the on-board cameras 118, 120, 122, 124 may be output to the control module 306 for display on the external transaction system display 310.

The controller 158 may be configured to interface with a nomadic device 350 such as a phone, tablet, or computer. The nomadic device 350 may include a processor system 354 that includes a processor and storage devices. The nomadic device 350 may include a wireless communication module 352 configured to communicate wirelessly with other devices and systems. The wireless communication module 352 may have capabilities as described for the vehicle wireless communication module 156 and the external transaction system wireless communication module 302. The nomadic device may be configured to establish and maintain wireless communication with the external transaction system 300, the vehicle 110, and/or an external network. Further, the nomadic device 350 may include a display screen 356 that may be a touch-screen. The boundary alert sensors may be activated and monitored by the nomadic device 350 via the wireless communications module 156. The vehicle controller 158 may transmit sensor data from the boundary alert sensors to the nomadic device 350. The nomadic device 350 may execute a program to interface with the controller 158 to display boundary alert system data. In many situations, the nomadic device 350 may be located within the vehicle 110.

In addition, the remote GUI may be implemented on the nomadic device 350. In a similar manner, the nomadic device 350 may be configured to implement the remote GUI and establish communication with the external transaction system 300. The operator may conduct transactions from within the vehicle 110 using the nomadic device 350. In some configuration, the nomadic device 350 may establish a communication link with the external transaction system 300. The control module 306 may transmit transaction related screen data to the nomadic device 350. The controller 158 may also establish communication with the nomadic device 350 and transmit boundary alert system data to the nomadic device 350 for display. The nomadic device 350 may send a request to the vehicle controller 158 to enable the boundary alert system 100 during the transaction. In some configurations, the nomadic device 350 may receive both transaction related screen data and boundary alert system data from the vehicle controller 158.

Allowing transactions to be conducted within the vehicle 110 improves safety to some extent. However, the operator may still be distracted by operating the nomadic device 350 or the display module 144 to complete the transaction. The attention of the operator may be focused on conducting the transaction and not paying attention to happenings in the vicinity of the vehicle 110. An operator may still be vulnerable, for example, if the doors of the vehicle 110 are unlocked. An additional way to improve driver security may be to automatically activate the boundary alert system 100 when the vehicle 100 is proximate the external transaction system 300 (e.g., in a drive-through lane or at a drive-up ATM). Further, the controller 158 may transmit data associated with the boundary alert system 100 to the display module 144 or the nomadic device 350 to provide status to the operator. Such a solution increases the chances that the operator notices suspicious activity in the vicinity of the vehicle 110 as the indications may appear on the same screen as the transaction that is in progress.

The navigation system 126 may store or access a database of locations at which an external transaction system or drive-through service lane is present. For example, the navigation system 126 may be configured to identify the presence of an ATM at the present vehicle location. The navigation system 126 may be configured to output a signal when a present position of the vehicle 110 is in proximity to any external transaction systems or ATMs.

In some configurations, the boundary alert system 100 of the vehicle 110 may be manually activated by the operator. A physical or virtual button/switch may be configured to activate the boundary alert system 100. Manual activation permits the operator to invoke the boundary alert functions at any time. The controller 158 may receive a signal from the button/switch and activate the boundary alert system 100 in response to the signal.

In some configurations, the boundary alert system 100 may be automatically activated. The controller 158 may receive data from the navigation system 126, including a signal indicative of an external transaction system at a present vehicle location. The controller 158 may activate the boundary alert system 100 automatically in response to the signal. Further, the controller 158 may activate the boundary alert system 100 when communication with the external transaction system has been established. The controller 158 may also activate the boundary alert system 100 when communication is established with the nomadic device 350 that has established communication with the external transaction system 300.

The controller 158 may be configured to assess additional conditions before activating the boundary alert system 100. For example, the activation of the boundary alert system 100 may require that the vehicle 110 be in a stationary condition. The stationary condition may include the vehicle 110 being in a non-driving gear, such as park. The stationary condition may include the vehicle 110 being in a gear than permits movement (e.g., drive, neutral, reverse) so long as the brake pedal is depressed to prevent movement. The stationary condition may further include that vehicle speed is below a threshold indicative of the vehicle 110 being stationary. The controller 158 may receive a signal from a vehicle powertrain indicative of a present transmission gear. The controller 158 may receive signals from one or more door modules indicative of a state of the door locks and window status. In addition to activating the boundary alert system 100, the controller 158 may request or command that doors be locked. In the automatic activation mode, the operator may be prompted to confirm that the boundary alert system 100 should be enabled.

Figure 4:
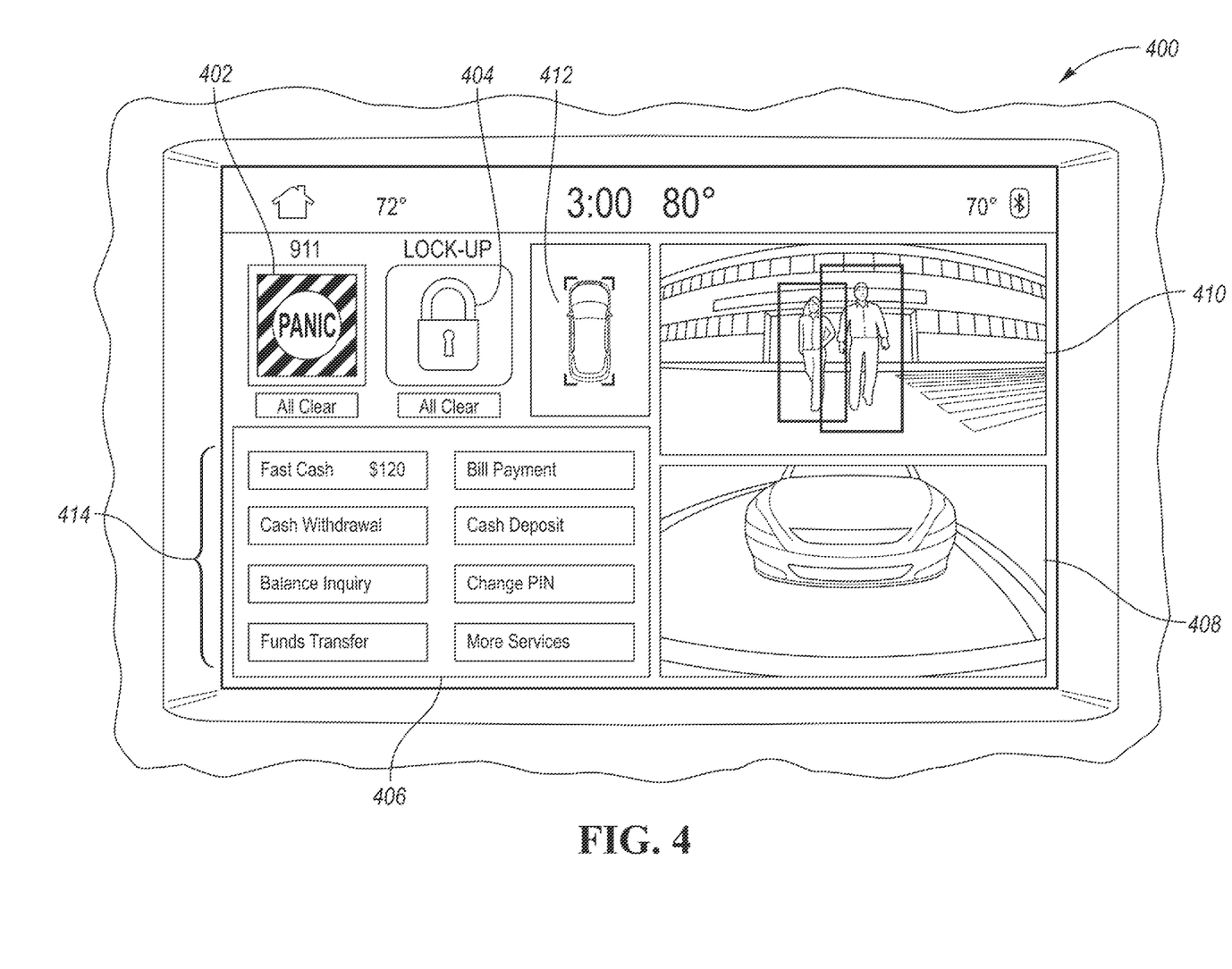
FIG. 4 depicts a possible screen layout for integrating the boundary alert system with the external transaction system.

FIG. 4 depicts one possible configuration of the content displayed on the display module 144 of the vehicle 110 or the GUI of the nomadic device 350 that is in communication with the vehicle. Note that numerous other possible configurations are possible. The controller 158 may be configured to output screen data and control the display location of the screen data. The controller 158 may be configured to divide the screen area 400 of the display module 144 into different display zones for displaying each element of information. For example, a transaction zone 406 may be defined to display the screen data (e.g., GUI) received from the external transaction system 300. The external transaction system screen data may include one or more interactive virtual buttons 414 having functions defined by the external transaction system 300. When contact is made with the corresponding area of the screen, the information may be relayed to the control module 306 of the external transaction system 300 to process the command. The transaction zone 406 may display the same content as the display 310 of the external transaction system 300. In some systems, the ATM may display a blank screen during in-vehicle ATM operations. The operator may interact with the in-vehicle display 144 to complete the desired transaction.

One or more screen zones may be dedicated to displaying video streams from the on-board and off-board cameras. For example, a first camera zone 408 may be configured to display the video stream from one of the cameras (on-board or off-board). A second camera zone 410 may be configured to display the video stream of a second camera. Additional camera zones may be defined. The controller 158 may be programmed to provide an interface for selecting the video streams to be displayed. The controller 158 may be programmed to output one or more default video streams if the operator has not configured the display. In other configurations, the displayed video streams may be determined automatically based on movement or objects detected by the boundary alert sensors. For example, the default or user-selected video streams may be initially displayed. When the controller 158 receives signals from the boundary alert sensors on a particular side of the vehicle indicative of a potential threat, the controller 158 may reconfigure one of the displayed camera zones to output the video stream from the camera mounted on the particular side in which the potential threat was detected. In such a manner, the video feeds may always display those areas of most interest to the driver.

In some configurations, the video stream from each of the cameras may be displayed in a separate zone of the screen area 400. The controller 158 may, in response to receiving signals from one of the boundary alert sensors indicative of a potential threat, highlight the video feed associated with the boundary alert sensor (e.g., video from camera in same direction as boundary alert sensor). For example, a red highlight box may be displayed to outline the video feed. In some configurations, the highlight box may be flashed to further draw attention to the video feed. In other configurations, the associated video feed may be enlarged to allow better viewing and to draw attention to the video feed.

A boundary sensor information zone 412 may be defined in the area of the screen 400. The boundary sensor information zone 412 may display status information from the boundary alert sensors in directions around the vehicle. The status information may include the availability of the various boundary alert sensors. The status information may include an indication of a presence of a potential threat as well as a distance, if known, of the potential threat. For example, a moving object detected by the front-facing radar may cause display of an indicator corresponding to the front of the vehicle icon. Distance of the threat may be indicated by color. For example, the color may change from yellow to red if the potential threat moves closer to the vehicle.

The controller 158 may be programmed to cause display of a lock-up button 404 in the screen area 400. In response to feedback from the display module 144 that the lock-up button 404 has been pressed (e.g., contact with screen at position at which lock-up button is displayed), the controller 158 may command activation the door locks to a locked position. The controller 158 may further command the windows to a closed position and a sunroof/moonroof to a closed position. Further, the controller 158 may command exterior lights to illuminate or flash to notify those outside that activity has been detected.

The controller 158 may be programmed to cause display of a panic button 402 in the screen area 400. In response to feedback from the display module 144 that the panic button 402 has been pressed (e.g., contact with screen at position at which panic button is displayed), the controller 158 may initiate a program to contact emergency personnel, such as local law enforcement, of the condition. For example, the controller 158 may initiate dialing of 911 and output a pre-recorded message along with the vehicle location in response to receiving a signal indicative of user activation of the panic button 402. Further, the controller 158 may activate an alarm system that triggers activation of the horn or other alarm device.

In some configurations, a first press of the panic button 402 may initiate a silent alarm. In response to the silent alarm, the controller 158 may initiate the emergency notification. A second press of the panic button 402 may initiate an audible and visible alarm in which the horn and lights are activated. In some configurations, a first press of the panic button 402 may result in an emergency notification and the audible and visible alarm. Further, in response to a press of the panic button 402, the functions performed by the lock-up button 404 may be initiated. The controller 158 may activate external lighting of the vehicle 110 in response to a press of the panic button 402. For example, the controller 158 may activate reverse park lamps, side puddle lamps, and adaptive light or turn lighting to better illuminate the vehicle perimeter.

In response to activation of the panic button 402 or the lock-up button 404, the controller 158 may record video streams from one or more of the cameras into non-volatile memory. In addition, the controller 158 may record data from the boundary alert sensors. In some configurations, the recorded data may be transmitted to an off-board device via the wireless communication module 156 to implement a cloud-based storage of the video data. Cloud-based storage may allow remote access to the video data.

The screen area reserved for each of the display zones may be configurable and the relative size of each zone may vary. In other configurations, the screen area of the display module 144 may be configured to display the transaction zone 406 in a full-screen mode. In this configuration, the transaction zone 406 may utilize the entire area of the screen 400. The controller 158 may, in response to receiving signals indicative of a potential threat by one or more of the boundary alert sensors, reduce the screen area 400 reserved for the transaction zone 406. Further, the controller 158 may cause display of a video stream from the camera in the direction of the potential threat in the remaining screen area. For example, the screen area 400 may transition from displaying the transaction zone 406 in a full-screen mode to that configuration shown in FIG. 4.

In some configurations, the controller 158 may alternate displaying video streams in a single camera zone. For example, the controller 158 may output a video feed for each zone in the single camera zone for a predetermined time. The controller 158 may sequence through each of the video feeds and repeat.

In some configurations, a 360 degree stitched view may be displayed on the screen. The stitched view function may receive video or camera input from the cameras on all sides of the vehicle. The stitched view image may be similar to a panoramic image generated by digital cameras except that images are selected to surround the vehicle as opposed to a limited range. The images may be spliced together in one screen area to present a 360 degree view of the surrounding area. For examples, the center of the stitched view may display images from the front. On either side may be displayed images from the sides of the vehicle. Finally, images from the back of the vehicle may be displayed on the far edges of the stitched image. The resulting stitched image provides images of the surrounding area in one screen area making it easy for the operator to view the area surrounding the vehicle. For example, the vehicle may include four cameras, one on each side of the vehicle. The video outputs may be processed by the controller 158 and a 360 degree stitched view may be output to the display 144.

The transaction with the external transaction system 300 may be conducted within the vehicle 110 using the display module 144 of the vehicle 110 or the nomadic device 350. Further, the transaction may be conducted using an interface of the external transaction system 300. For example, the external transaction system 300 may be a walk-up ATM terminal. The vehicle 110 may be parked in the vicinity of the external transaction system 300. Upon detecting that the present vehicle location is proximate the external transaction system 300, the controller 158 may attempt to establish communication with the external transaction system 300. Detection of the location may be based on location information from the navigation system 126. Upon establishing communication between the controller 158 and the external transaction system 300, the boundary alert system 100 may be activated and data from the boundary alert system 100 may be transmitted to the external transaction system 300 for output to the external transaction system display 310. In this manner, the boundary alert system information may be viewed by the operator during the transaction. The display may appear similar to that of FIG. 4. The various display elements may function similar for any display device that is utilized (e.g., external transaction system display 310, nomadic device 350, and/or display module 144). The system may be configured to integrate the display of transaction interface and boundary alert system data on a display unit that may be an on-vehicle display 144, the nomadic device 350, and the external transaction system display 310.

The boundary alert system 100 may be used to improve driver security at drive-through and walk-up service locations. By utilizing the boundary alert sensors to identify potential threats, safety at these locations is improved. In addition, the security features come with little added cost to the vehicle as many of the boundary alert sensors are presently installed in vehicles. The function of displaying boundary alert system information with transaction-related data is achieved regardless of the device selected to perform the transaction. Safety is improved as the person performing the transaction has access to information about the immediate surroundings on the same screen on which the transaction is being performed. As such, the person may detect unsafe situations and perform evasive actions sooner than without the use of the system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle boundary alert system for a vehicle comprising:
    one or more boundary alert sensors including at least one non-camera sensor and a plurality of cameras, each of the cameras associated one of a plurality of detection zones;
    a display disposed in the vehicle; and
    a controller programmed to, in response to establishing communication with an external transaction system to perform a transaction, (i) activate the boundary alert system to monitor the at least one non-camera sensor for potential threats proximate the vehicle and (ii) cause the display to show screen data received from the external transaction system in a first display zone to facilitate the transaction, and, responsive to signals from the at least one non-camera sensor being indicative of a potential threat in one of the detection zones, change the display to show a video stream from one of the cameras associated with the one of the detection zones in a second display zone.

2. The vehicle boundary alert system of claim 1 wherein the controller is further programmed to receive video data from the external transaction system and cause the display to show the video data in a third display zone.

3. The vehicle boundary alert system of claim 1 wherein the controller is further programmed to process the video stream to detect an object within a predetermined distance of the vehicle boundary alert system and, in response to detecting the object, cause the display to show an alert indicator.

4. The vehicle boundary alert system of claim 1 wherein the controller is further programmed to cause the display to show a lock-up button on the display and, in response to receiving a signal indicative of an activation of the lock-up button, command activation of door locks, command closing of windows, and flash external lights.

5. The vehicle boundary alert system of claim 1 wherein the controller is further programmed to cause the display to show a panic button, and in response to receiving a signal indicative of user activation of the panic button, initiate a call to emergency personnel.

6. The vehicle boundary alert system of claim 5 wherein the controller is further programmed to, in response to the signal, command activation of lights of the vehicle and command activation of a horn of the vehicle.

7. The vehicle boundary alert system of claim 1 wherein the controller is further programmed to allocate screen area of the display to the first display zone and the second display zone and, in response to receiving signals from the boundary alert sensors that are indicative of a potential threat in a vicinity of the vehicle, reduce screen area allocated to the first display zone and increase screen area allocated to the second display zone.

8. The vehicle boundary alert system of claim 1 wherein the at least one non-camera sensor includes one or more of a radar, an infrared sensor, a LIDAR, and an ultrasonic sensor.

9. The vehicle boundary alert system of claim 1 wherein the controller is further programmed to, in response to establishing communication with a nomadic device when the vehicle is proximate the external transaction system, output to the nomadic device the video stream and signals from the boundary alert sensors for display on the nomadic device to facilitate the transaction.

10. A vehicle comprising:

one or more boundary alert sensors including at least one non-camera sensor and a plurality of cameras for monitoring a plurality of detection zones; and a controller programmed to output screen data received from an external transaction system to a display device and, in response to signals from the at least one non-camera sensor being indicative of a potential threat in one of the detection zones while communicating with the external transaction system to perform a transaction, cause the display device to show a video stream from one of the cameras associated with the one of the detection zones.

11. The vehicle of claim 10 wherein the controller is further programmed to output video streams from each of the cameras to the display device for display and, in response to signals from the boundary alert sensors being indicative of the potential threat in one of the detection zones, cause the display device to highlight the one of the video streams associated with the one of the detection zones.

12. The vehicle of claim 10 wherein the controller is further programmed to, in response to receiving an alarm signal from the display device, activate external lights of the vehicle and activate a horn.

13. The vehicle of claim 10 wherein the controller is further programmed to, in response to receiving a lock-up signal from the display device, request activation of door locks to a locked position and request activation of windows to a closed position.

14. The vehicle of claim 10 wherein the controller is further programmed to output presence and position data of potential threats identified by the controller to the display device.

15. A method comprising:

activating, by a controller, a boundary alert system of a vehicle in response to the vehicle being proximate an external transaction system; and outputting, by the controller, a video stream from an on-board camera and data indicative of a presence and a position of a potential threat identified by the boundary alert system to a display unit for display on a screen with a transaction interface from the external transaction system.

16. The method of claim 15 wherein the display unit is one or more of an on-board display, a nomadic device, and the external transaction system.

17. The method of claim 15 further comprising activating, by the controller, in response to receiving a signal indicative of user activation of an alarm button, at least one light on the vehicle and a horn of the vehicle.

18. The method of claim 15 further comprising activating, by the controller, in response to receiving a signal indicative of user activation of a lock-up button, door locks of the vehicle to a locked position.

19. The method of claim 15 further comprising processing, by the controller, sensor data from the boundary alert system to identify a potential threat in one of a plurality of detection zones and selecting the video stream to output from the on-board camera associated with the one of the detection zones.

* * * * *